April 23, 1940.　　　　　S. CAREY　　　　　2,198,510
DISH DRAINING AND SPRAYING APPARATUS
Filed April 24, 1939
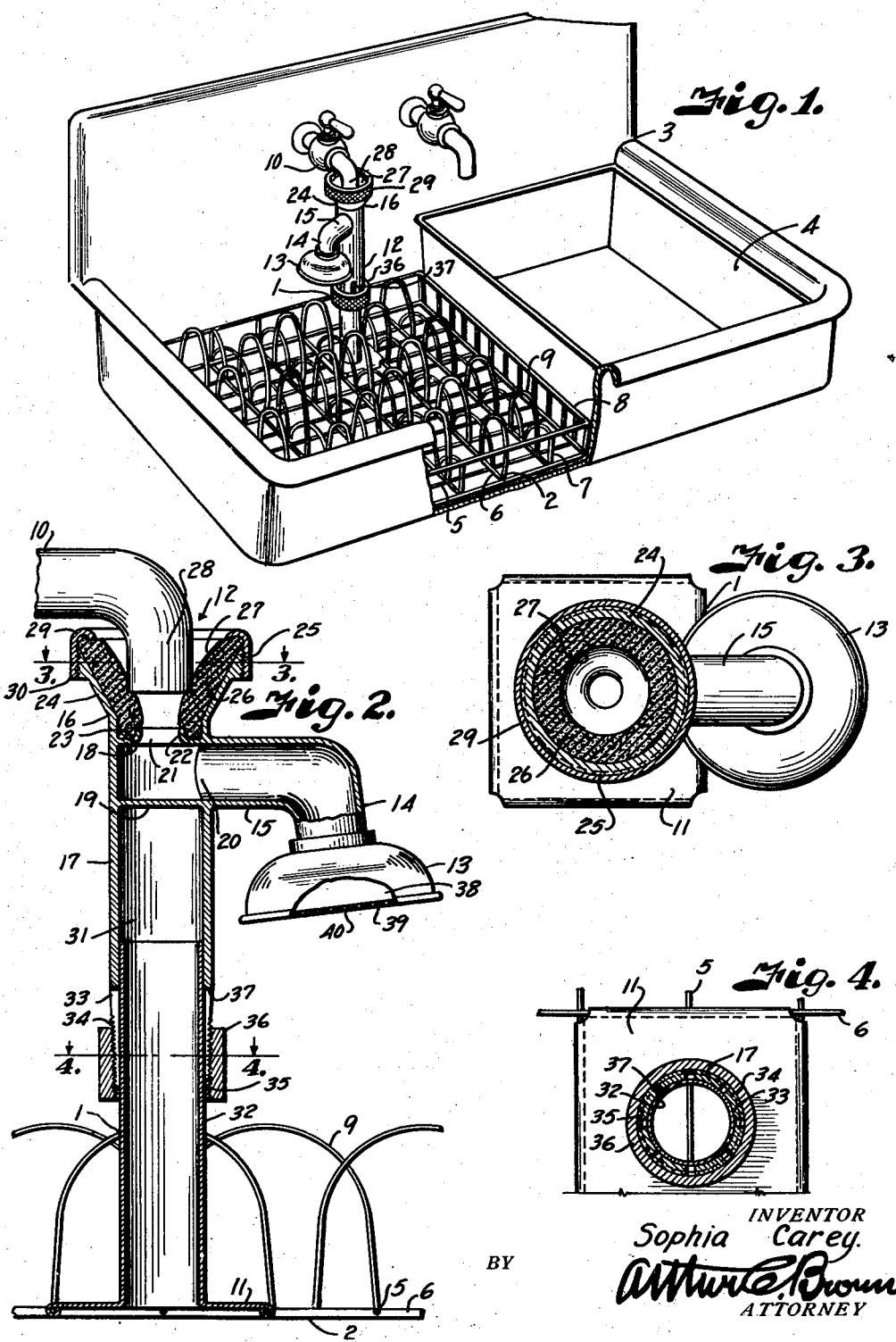
INVENTOR
Sophia Carey.
BY
Arthur C. Brown
ATTORNEY Patented Apr. 23, 1940

2,198,510

UNITED STATES PATENT OFFICE 2,198,510

DISH DRAINING AND SPRAYING APPARATUS

Sophia Carey, Kansas City, Mo.

Application April 24, 1939, Serial No. 269,595

6 Claims. (Cl. 141—9)

This invention relates to dish draining and spraying apparatus, and has for its principal object to provide for effectively spraying and scalding dishes in a facile manner.

Other objects of the invention are to provide an apparatus of this character that is readily adapted to any standard sink and adjustably connected with a faucet thereof; and to provide a swivelly mounted spray head arranged to cover the entire tray.

In accomplishing these and other objects of the invention, I have provided improved details of structure, the preferred form of which is illustrated in the accompanying drawing wherein:

Fig. 1 is a perspective view of a dish draining and spraying apparatus installed in a standard kitchen sink and connected with the faucet thereof.

Fig. 2 is an enlarged vertical section through a portion of the tray and the spraying mechanisms supported thereby, particularly illustrating connection of the faucet.

Fig. 3 is a horizontal section on the line 3—3 of Fig. 2.

Fig. 4 is a horizontal section on the line 4—4 of Fig. 2.

Referring more in detail to the drawing:

1 designates a dish draining and spraying apparatus embodying the features of the present invention and which includes a tray or basket 2 of size and shape to fit conveniently within an end of an ordinary kitchen sink 3 and in juxtaposition with a dish pan 4 placed in the opposite end of the sink.

The tray illustrated is shown as formed of wire having longitudinal and transverse strands 5 and 6 forming the bottom thereof and terminating in upwardly extending ends 7 connected by a rim 8. The transverse strands 6 carry dish supporting wires 9 adapted to sustain dishes in a position in the rack so that wash water will readily drain therefrom into the sink and whereby all surfaces of the dishes are exposed to the action of the spraying mechanism later described.

Fixed to selected longitudinal and transverse strands 5 and 6 of the tray at a point under the hot water faucet 10 of the sink is a base plate 11 carrying the spraying mechanism 12.

The spraying mechanism includes a spray head 13 fixed to the depending terminal 14 on a lateral, tubular arm 15 of a faucet engaging fitting 16. The fitting 16 includes a substantially tubular body 17 having transverse partitions 18 and 19 respectively located above and below the inlet 20 to the arm 15. The partition 18 has a port 21 encircled by an upwardly directed annular flange 22 which cooperates with the partition to form an annular groove-like seat 23. The portion of the fitting above the seat 23 flares outwardly to form a funnel shaped head 24 which has a rim provided with threads 25. Mounted within the funnel shaped head and engaging the seat 23 is a resilient gasket 26 having a correspondingly tapered socket 27 to receive the nozzle 28 of the faucet 10.

The gasket is preferably formed of highly resilient material so that an adequate seal is effected with the nozzle with a minimum pressure on the gasket. The gasket is retained by a ring 29 having an inwardly directed flange engaging over the upper periphery of the gasket and a depending internally threaded skirt 30 engaging the threads on the funnel-like head. The lower portion of the tubular body forms a sleeve-like socket 31 telescopingly engaged with a spindle 32 that is attached to the base plate 11. The lower end 33 of the fitting is provided with an inwardly and downwardly tapering periphery having threads 34 for engaging the internal threads 35 on a ring-like clamping nut 36. The threaded portion of the fitting is slotted as at 37 so that when the nut is threaded upon the taper the slotted portion of the fitting is contracted about the spindle to retain the gasket 26 in sealing contact with the nozzle of the faucet. The nut, however, is not tightened sufficiently to prevent swivelling of the fitting relatively to the faucet.

The spray head may be of any suitable type but is here shown as comprising a hollow, disk-like body 38 having a flat face portion 39 provided with a plurality of spray orifices 40 through which hot water from the faucet is discharged over the dishes carried in the tray.

In using a draining and spraying apparatus constructed as described, the ring-like nut 36 is loosened so that the spray head fitting will slide downwardly on the spindle to the point where the partition 19 engages the upper end of the spindle. The tray is then placed in the sink alongside the pan 4 and in a position so that the socket of the fitting aligns with the faucet nozzle. The fitting is then raised on the spindle to seat the gasket 26 tightly against the faucet nozzle as shown in Fig. 2. The ring-like nut is then threaded upwardly on the slotted end of the fitting to effect gripping of the spindle and maintain an effective seal with the faucet. The nut is not tightened sufficiently to prevent arcuate or swivel movement of the spray head over the tray. Attention is here directed to the fact that the tapered socket of the gasket accommodates the device to any size and shape of faucet.

The dishes are washed in the pan 4 and placed in the tray to drain. The faucet 10 is opened and hot or scalding water is discharged through the spray head upon the dishes. At the same time the spray head is swung back and forth across the tray so that the jets of water reach all of the surfaces of the dishes. When the faucet is turned off the water readily drains and dries from the dishes.

From the foregoing it is obvious that I have provided a dish draining and spraying apparatus that is readily adjustable to the faucet of any standard sink and is readily manipulated to effectively spray dishes contained in the tray.

What I claim and desire to secure by Letters Patent is:

1. An apparatus of the character described including a dish supporting tray, a spray head fitting having a socket, sealing means carried by the socket and adapted to engage a faucet, and swivel means adjustably mounting the fitting on the tray to engage said socket with a faucet.

2. An apparatus of the character described including a dish supporting tray, a spindle carried by the tray, a spray head fitting having vertical movement on the spindle, means for selectively clamping the fitting on the spindle, a spray head carried by said fitting, and a faucet engaging portion on said fitting.

3. An apparatus of the character described including a dish supporting tray, a spindle on the tray, a spray head fitting including a tubular body slidable over the spindle, means for clamping said tubular body in a selected position on the spindle, a funnel shaped head carried by the fitting and having a resilient gasket adapted to sealingly engage a faucet, and a spray head carried by said fitting.

4. An apparatus of the character described including a dish supporting tray, a spindle on the tray, a spray head fitting including a tubular body slidable over the fitting and having a contractable portion, a nut for contracting said portion about the spindle, a funnel shaped head carried by the fitting and having a resilient gasket adapted to sealingly engage a faucet, and a spray head on said fitting.

5. An apparatus of the character described including a dish supporting tray, a spindle on the tray, a spray head fitting including a tubular body slidable over the fitting and having a contractable portion, a nut for contracting said portion about the spindle, a funnel shaped head carried by the fitting and having a resilient gasket adapted to sealingly engage a faucet, a lateral arm carried by the fitting, and a spray head on said lateral arm.

6. An apparatus of the character described including a dish supporting tray, a spray head fitting, means swively and adjustably supporting the fitting on the tray, a resilient gasket on the fitting to sealingly engage with a faucet, and a spray head carried by said fitting.

SOPHIA CAREY.